United States Patent

Kopeika et al.

Patent Number: 5,841,911
Date of Patent: Nov. 24, 1998

[54] METHOD FOR THE RESTORATION OF IMAGES DISTURBED BY THE ATMOSPHERE

[75] Inventors: Norman S. Kopeika, Beer-Sheva; Dan Sadot, Rehovot, both of Israel

[73] Assignee: Ben Gurion, University of the Negev, Beer-Sheva, Israel

[21] Appl. No.: 470,344

[22] Filed: Jun. 6, 1995

[51] Int. Cl.$^6$ .................................................. G06K 9/40
[52] U.S. Cl. ..................... 382/254; 382/260; 382/275; 364/724.01
[58] Field of Search ................................... 382/103, 106, 382/260–261, 254–255, 275; 364/724.01; 250/370.09, 201.9

[56] References Cited

U.S. PATENT DOCUMENTS

| | | | |
|---|---|---|---|
| 5,340,988 | 8/1994 | Kingsley et al. | 250/370.09 |
| 5,414,782 | 5/1995 | Carasso | 382/128 |
| 5,448,053 | 9/1995 | Rhoads | 250/201.9 |

OTHER PUBLICATIONS

Gonzalez, Digital Image Processing, Addison–Wesley, 1992, pp. 252–257, pp. 279–282.

Primary Examiner—Jose L. Couso
Assistant Examiner—Anh Hong Do
Attorney, Agent, or Firm—James M. Deimen

[57] ABSTRACT

A method of real-time high resolution imaging through the atmosphere is presented. This technique is based on knowledge of average atmospheric Modulation Transfer Function (MTF) at the time the image is received. Atmospheric effects are characterized by a noise spatial frequency filter including an average component described by the average atmospheric Modulation Transfer Function, and a noisy component modeled by the atmospheric Point Spread Function's power spectral density. The noisy component represents random changes in atmospheric MTF. The new method of image restoration results in significant image quality improvement based upon knowledge of average atmospheric MTF which includes both turbulence and aerosol MTF components. This method can be used to help overcome the jitter characteristics of turbulence, and is capable of yielding real-time image restoration with resolution limited essentially only by the hardware itself. Turbulence blur, aerosol blur, and contrast degradation are all corrected simultaneously in real time.

9 Claims, 13 Drawing Sheets

Wiener filter

METHOD FOR THE RESTORATION OF IMAGES DISTURBED BY THE ATMOSPHERE

BACKGROUND OF THE INVENTION

The field of the present invention relates to a method particularly useful to restore images which are degraded by atmospheric distortions caused by optical turbulence, and scattering and absorption caused by particulates in the atmosphere.

Imaging through the atmosphere has progressed significantly in the last decade, in both the visible and infrared spectral ranges. It is the atmosphere which usually limits image quality, particularly for long atmospheric paths. The effects of the turbulent medium over long exposures are to produce image blur at high spatial frequencies, and to produce wavefront tilt, which causes image shifts at the image plane. These tilt effects can be whole image shifts, or different shifts of different parts of the image, depending on the isoplanatic patch, according to the turbulence parameters (turbulence strength, inner and outer scales). The image distortions caused by the wavefront tilt (typically on the order of tens or maybe hundreds of microradians) can be partially compensated for either by adaptive optics techniques or by using sufficiently short exposure time, less than the characteristic fluctuation time (usually a few milliseconds). Another partial compensation technique is described in "Deconvolution from Wavefront Sensing" by J. Primot et al. in *Journal of Optical Society of America*, A. 7., No. 9 (September 1990). This method uses a wavefront sensor to construct the atmospheric Phase Transfer Function (PTF) in addition to image intensity, and therefore restore the image in a more accurate way. This method is, however, not practical for real time restoration.

Turbulence distortion effects are characterized in both short and long exposures by Modulation Transfer Functions (MTF). These effects are demonstrated in the articles "Optical Resolution Through a Randomly Inhomogeneous Medium for Very Long and Very Short Exposure" by D. Fried in *Journal of Optical Society of America*, 56, No. 10 (October 1966) and in "Statistical Optics" by J. W. Goodman, John Wiley of Sons, New York, (1985). These are statistical averages of turbulence random processes which have, in addition, a non-negligible short-time variance or jitter which affects significantly image blur.

In addition to turbulence, there are scattering and absorption effects produced by molecules and aerosols in the atmosphere. These cause attenuation and image blur, according to the atmospheric aerosol MTF. The effects of the aerosol MTF are taught in "Wave Propagation and Scattering in Random Media" by A. Ishimaru (Volume 1, *Academic Press*, New York (1978)), "Atmospheric Degradation of Electrooptical System Performance" by R. F. Lutomirski in *Applied Optics*, 17, No. 24 (December 1978), "Effects of Absorption Attenuation on Image Quality Through a Particulate Medium" by D. Sadot et al. in *Applied Optics*, 33, No. 30 (October 1994) and "Practical Instrumentation—Based Theory and Verification of Aerosol MTF" by D. Sadot et al. in *Journal of Optical Society of America A*, 10, No. 1 (January 1993). Unlike turbulence, the aerosol MTF affecting the image is also related strongly to instrumentation limitations on angles of light actually recorded in the image. Thus, aerosol effects can be approximated by an MTF of limited long-time variation, according to weather conditions.

In addition to all the atmospheric distorting effects described above, the overall atmospheric MTF also fluctuates randomly mainly due to the turbulence jitter. Therefore, the overall atmospheric MTF acts on as a random spatial frequency filter. While the average component effect is that of a standard transfer function according to the classical system approach, the jitter or noisy component induces a multiplicative noise component.

SUMMARY OF THE INVENTION

According to the present invention, there is provided a method to restore images distorted by the atmosphere. This method can be embedded as a "real time" algorithm in a microprocessor which is an integral part of an imaging system. The method consists of an "Improved Wiener Filter" which improves restoration results significantly. The restoration process is based on the statistical characteristics of the distorting medium, rather than being a deterministic-based correction (as, for example, adaptive optics is).

THEORETICAL BACKGROUND

The mathematical discussion below provides the basis required to understand the details of the present invention.

The present method is developed for restoration of images distorted by the atmosphere, based on prior knowledge of both average turbulence and aerosol MTFs (Modulation Transfer Function). The atmosphere is modeled as a random filter according to:

$$h' = h + n_1 \qquad (1)$$

where h' is the instantaneous atmospheric Point Spread Function (PSF), h is the average atmospheric PSF, and $n_1$ is an additive random component with zero expectation. Using this model, the image received at the imaging system after propagating through the atmosphere is:

$$g(x,y) = (h(x,y) + n_1(x,y)) \otimes f(x,y) + n_2(x,y) \quad (2)$$

where g is the received image, f is the object, x and y are transverse spatial coordinates, and $n_2$ is an additive noise imposed by the instrumentation, including optics, digitization, and electronics, but not by the atmosphere. $\otimes$ denotes the convolution operator. Fourier transforming (2) yields:

$$G(u,v) = [H(u,v) + N_1(u,v)] \cdot F(u,v) + N_2(u,v) \quad (3)$$

where G, H, F, $N_1$ and $N_2$ are Fourier transforms of g, h, f, $n_1$ and $n_2$ respectively, and u and v are spatial frequency coordinates. The received image thus is a sum of a deterministic part $G_1$ and a random part N:

$$G = G_1 + N \quad (4)$$

where:

$$G_1(u,v) = H(u,v) \cdot F(u,v) \quad (4.a)$$

and:

$$N(u,v) = F(u,v) \cdot N_1(u,v) + N_2(u,v) \quad (4.b)$$

Therefore, there are two noise components: $N_2$ which is the regular additive noise imposed by instrumentation, and $N_1$ which is a multiplicative noise component imposed by the turbulence jitter.

The optimal image restoration filter in terms of Least Mean Square error (LMS) is the well known Wiener Filter $$M(u,v) = \frac{|H(u,v)^2|}{H(u,v) \cdot (|H(u,v)^2| + [S_{nn}(u,v)/S_{ff}(u,v)])} \quad (5)$$

where M is the restoring filter, $S_{nn}$ and $S_{ff}$ are the power spectral densities (PSDs) of f and n, n being the inverse Fourier transform of N. Substituting (4.b) into (5) and assuming statistical independence between f, $n_1$, and $n_2$, yields $$M(u,v) = \frac{|H(u,v)^2|}{H(u,v) \cdot (|H(u,v)^2| + [S_{n_1 n_1} + S_{n_2 n_2}(u,v)/S_{ff}(u,v)])} \quad (6)$$

The restored image intended to represent the original object is then calculated by multiplying the filter by the received image spectrum in the frequency domain:

$$\hat{F}(u,v) = \frac{G(u,v)}{H(u,v)} \cdot \frac{|H(u,v)^2|}{|H(u,v)^2| + [S_{n_1 n_1} + S_{n_2 n_2}(u,v)/S_{ff}(u,v)]} \quad (7)$$

where $\hat{F}$ denotes the calculated restored image.

In order to use equation (7), all its terms must be either calculated or estimated. The term H(u,v) is the average atmospheric Modulation Transfer Function (MTF). Assuming independence between aerosol and turbulence effects, this term can be either directly measured or calculated by a multiplication of the turbulence MTF (either short or long exposure case) and aerosol MTF. Turbulence MTF can be evaluated with the knowledge of standard meteorological parameters using a prediction model as taught in "Forecasting Optical Turbulence Strength on the Basis of Macroscale Meteorology and Aerosol Models and Validation" by D. Sadot et al. in *Optical Engineering*, 31, No. 2 (February 1992). The aerosol MTF can be evaluated according to knowledge of particle size distribution as taught by the models developed by N. S. Kopeika and D. Sadot in "Imaging Through the Atmosphere: Practical Instrumentation-Based Theory and Verification of Aerosol MTF", *Journal Optical Society of America A*, Vol. 10, No. 1 (January 1993) and "Imaging Through the Atmosphere: reply to comment", *Journal Optical Society of America A*, Vol. 12, No. 5 (May 1995).

The term $S_{ff}(u,v)$ in equation (7) can be estimated either by using the received image G(u,v) or by using estimation models as taught by L. Guan and R. K. Ward in "Restoration of Randomly Blurred Images by the Wiener Filter", *IEEE Trans. Acoustics, Speech and Signal Proc.* 12, No. 4 (April 1989) and by Rosenfeld et al. in *Digital Signal Processing*, Academic Press, London (1976).

The term $S_{n_2 n_2}(u,v)$ is assumed to be constant for all spatial frequencies since the additive instrumentation noise $n_2$ is assumed to be white noise. This assumption is commonly used and very practical, and it has a relatively weak effect on the Wiener filter. The term $S_{n_1 n_1}(u,v)$ is very important since it includes the random part of the atmospheric distortions. If this term can be evaluated, then a Wiener filter can be used for restoration of images distorted by the atmosphere.

DESCRIPTION OF THE PREFERRED EMBODIMENTS

The main element of the invention is the calculation of the term $S_{n_1 n_1}(u,v)$ according to the following relationships:

$$S_{n_1 n_1} = E\{N_1^2\} = E\{H'^2\} - H^2 \quad (8)$$

where H' is the Fourier transform of h'. The variance of $N_1$ can be evaluated by calculating both terms of the right hand side of (8).

The second term $H^2$ is the square of the turbulence MTF which can be predicted as described in the article by Sadot et al., or can be directly measured. The first term $E\{H'^2\}$ is to be evaluated here analytically.

The instantaneous MTF of turbulence is given by the following expression derived by J. W. Goodman in *Statistical Optics* (John Wiley, New York 1985):

$$H'(u,v) = \frac{\iint \exp\{\chi(x,y) + \chi(x - \lambda f u, y - \lambda f v)\} dx dy}{\iint \exp\{2\chi(x,y)\} dx dy} \quad (9)$$

where $\chi = \ln A/A_0$ is the wave log amplitude fluctuation, A is the wave amplitude and $A_0$ is the wave amplitude in the absence of turbulence, f is the imaging system's focal plane, and $\lambda$ is the radiation wavelength. In a similar way, $H'^2$ is given by $$H'^2(u,v) = \frac{\iint\iint \exp[\chi(x,y) + \chi(x - \lambda f u -, y - \lambda f v) + \chi(x - \Delta x, y - \Delta y) + \chi(x - \Delta x - \lambda f u, y - \Delta y - \lambda f v)] dx dy d\Delta x d\Delta y}{\iint\iint \exp[2\chi(x,y) + 2\chi(x - \Delta x, y - \Delta y)] dx dy d\Delta x d\Delta y} \quad (10)$$

where $\Delta x$ and $\Delta y$ denote a small translation of x and y, respectively.

Taking the ensemble average of the numerator and the denominator of (10) and assuming that the spatial statistics of the medium are Wide Sense Stationary (WSS), the expected values are independent of x and y and can be factored outside the integrals. The denominator in (10) is a normalizing factor which is the zero frequency value, and will be ignored for the rest of this analysis for simplicity. The result is an average of the square of the optical transfer function given by $$E\{H'^2(u,v)\} = \iint E\{\exp[\chi(x,y)+\chi(x-\lambda fu, y-\lambda fv)+\chi(x-\Delta x,y-\Delta y)+\chi(x-\Delta x-\lambda fu, y-\Delta y-\lambda fv)]\}d\Delta xd\Delta y. \quad (11)$$

To aid in this calculation, we use the relation $$E\{\exp(z)\}=\exp(E\{z\}+\tfrac{1}{2}\mathrm{var}\{z\}) \quad (12)$$

where z is any Gaussian random variable (as $\chi$ is), and $$E\{\chi\}=-c_\chi(0) \quad (13)$$

where c is the covariance function. The expectation and variance of the variable in the exponent in (11) are:

$$E\{\chi(x, y) + \chi(x - \lambda fu, y - \lambda fv) + \chi(x - \Delta x, y - \Delta y) + \quad (14)$$

$$\chi(x - \Delta x - \lambda fu, y - \Delta y - \lambda fv)\} = 4\bar\chi = -4c_\chi(0)$$

$$\tfrac{1}{2}\mathrm{var}(\chi(x, y) + \chi(x - \lambda fu, y - \lambda fv) + \chi(x - \Delta x, y - \Delta y) + \quad (15)$$

$$\chi(x - \Delta x - \lambda fu, y - \Delta y - \lambda fv)\} =$$

$$\tfrac{1}{2} E\left\{\begin{bmatrix}(\chi(x, y) - \bar\chi) + (\chi(x - \lambda fu, y - \lambda fv) - \bar\chi) + \\ (\chi(x - \Delta x, y - \Delta y) - \bar\chi) + \\ (\chi(x - \Delta x - \lambda fu, y - \Delta y - \lambda fv) - \bar\chi)\end{bmatrix}^2\right\} =$$

$$2c_\chi(0) + 2c_\chi(\lambda fu, \lambda fv) + 2c_\chi(\Delta x, \Delta y) +$$

$$c_\chi(\Delta x + \lambda fu, \Delta y + \lambda fv) + c_\chi(\Delta x - \lambda fu, \Delta y - \lambda fv).$$

Substituting (14) and (15) into (12), and then into (11) yields:

$$E\{H'^2(u, v)\} \propto \iint \exp[-2c_\chi(0) + 2c_\chi(\lambda fu, \lambda fv) + 2c_\chi(\Delta x, \Delta y) + \quad (16)$$

$$c_\chi(\Delta x + \lambda fu, \Delta y + \lambda fv) + + c_\chi(\Delta x - \lambda fu, \Delta y - \lambda fv)]d\Delta xd\Delta y =$$

$$\exp[4c\chi(0)] \iint \exp[-6c_\chi(0) + 2c_\chi(\lambda fu, \lambda fv) + 2c_\chi(\Delta x, \Delta y) +$$

$$c_\chi(\Delta x - \lambda fu, \Delta y - \lambda fv) + c_\chi(\Delta x - \lambda fu, \Delta y - \lambda fv)]d\Delta xd\Delta y.$$

Using the relation between the turbulence MTF and the covariance function $$H(u,v) \propto \exp(-c_\chi(0)+c_\chi(\lambda fu,\lambda fv)) \quad (17)$$

and the change of variables:

$$u' = \frac{\Delta x}{\lambda f} \quad v' = \frac{\Delta y}{\lambda f} \quad (18)$$

Eq. (16) can be simplified to yield:

$$E\{H'^2(u,v)\} \propto H^2(u,v) \iint H^2(u',v')H(u'+u,v'+v)H(u'-u,v'-v)du'dv'. \quad (19)$$

Equation (19) determines the expected value of the squared MTF, or in other words the Point Spread Function's (PSF) Power Spectral Density. This evaluation determines the improved methodology.

The advantage of this improved methodology is that for this restoration technique the only information needed to evaluate (10) is the atmospheric average MTF. One has to measure or estimate the average turbulence MTF, then substitute it in (1 9) and (8) to yield $S_{n_1n_1}(u,v)$, and apply it to equation (7), the filter.

Experimental Results

A set of measurements was carried out in the open atmosphere in order to examine this method. Although the experiment here is based upon measured atmospheric MTF via PSF, in principle it can be applied to predicted atmospheric MTF.

Figure 1:
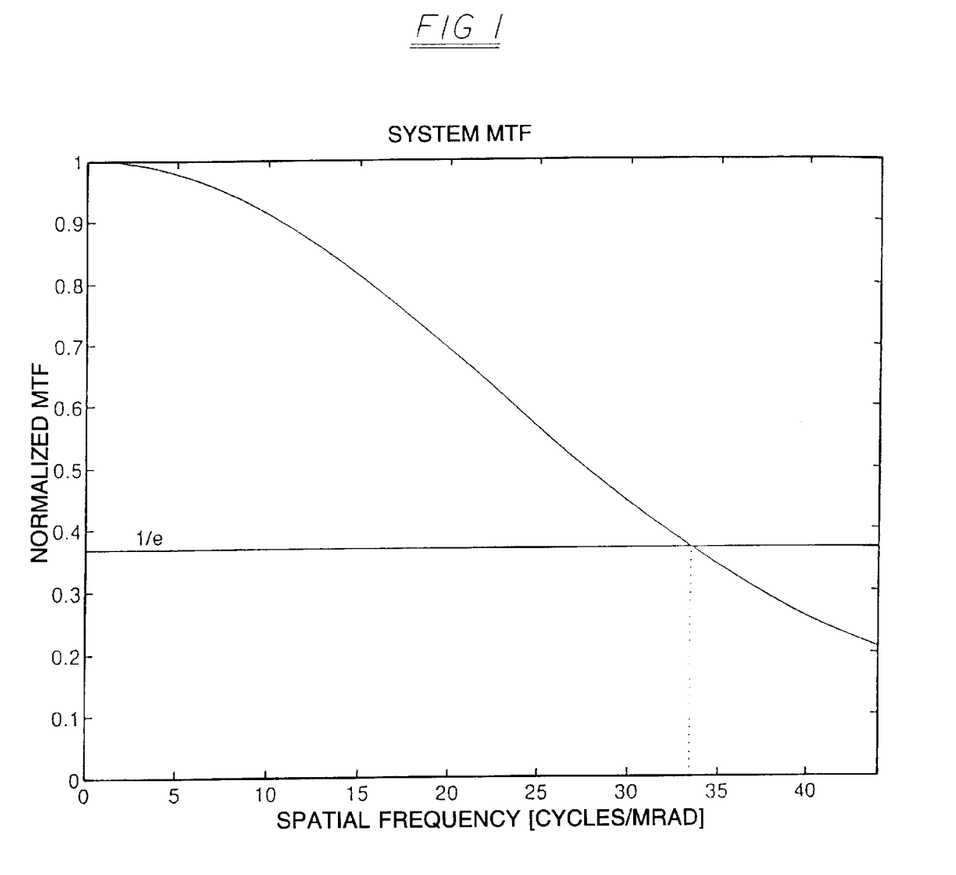
FIG. 1 shows a measured imaging system MTF.

An imaging system, including a Pulnix CCD camera model TM-765, connected to a Questar telescope of 3200 mm effective focal length, was located inside a remote sensing laboratory. Visible images were recorded over a horizontal pathlength of 6.5 km, with an average path elevation of 25 meters. No wavelength filters were used. Simultaneously, atmospheric MTF was measured via PSF measurements. This was carried out using a 4 mW HeNe laser at 0.6328 µm wavelength, located adjacent to the objects in the object plane. At 6.5 km distance, the laser aperture (<1 cm) served as a point source. The output signal from the CCD camera or a thermal infrared sensor was digitized by a Data-Translation frame grabber and sent to a computer for further analysis. Fourier transform of the PSF yielded the product of the imaging system and atmospheric MTFs. Division by measured system MTF, as illustrated in FIG. 1, yielded atmospheric MTF.

Figure 2:
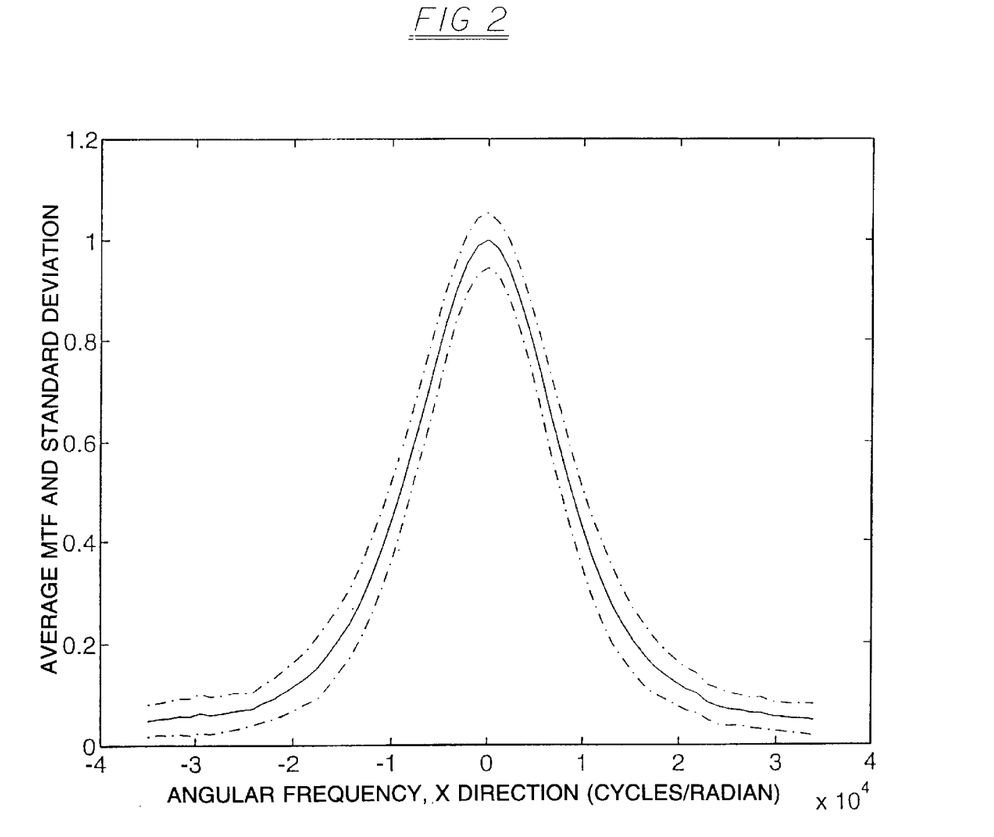
FIG. 2 shows a measured average atmospheric MTF with standard deviation.
Figure 3:
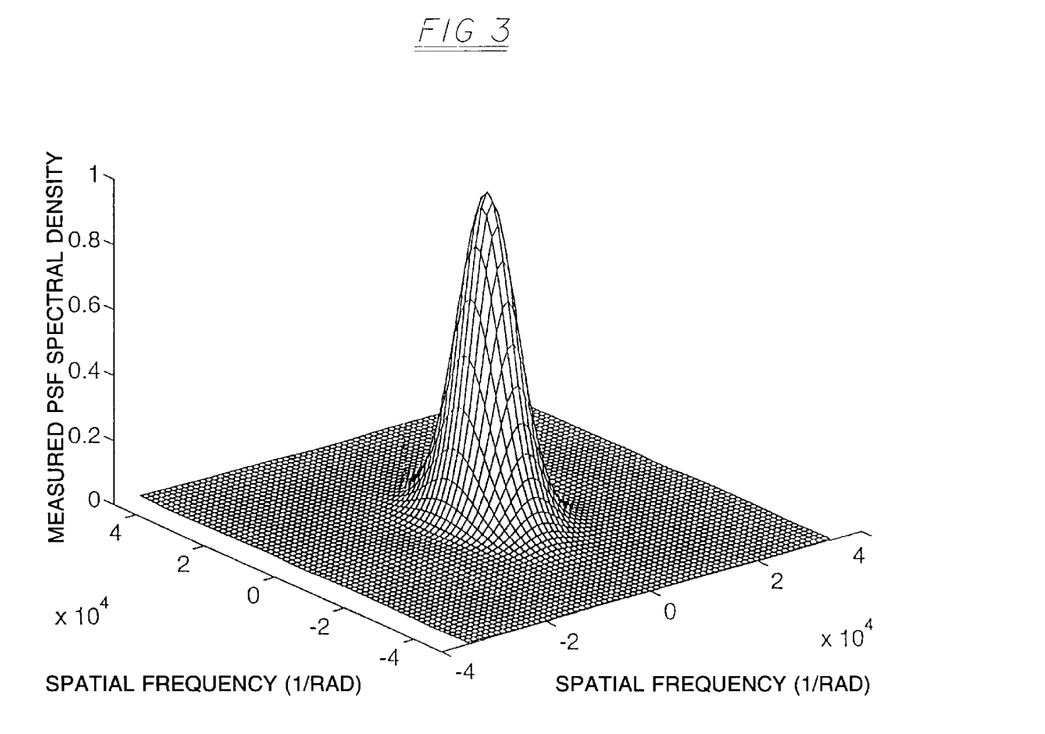
FIG. 3 shows a measured atmospheric Point Spread Function's (PSF) power spectral density.
Figure 4:
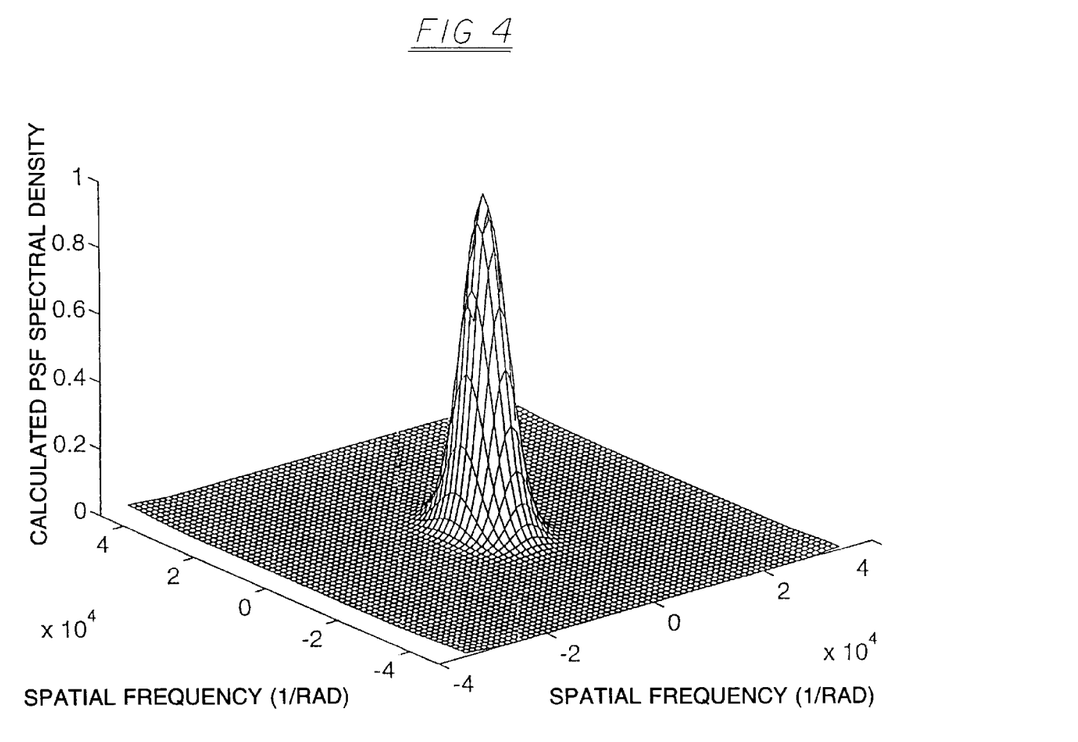
FIG. 4 shows a calculated atmospheric PSF's power spectral density.
Figure 5:
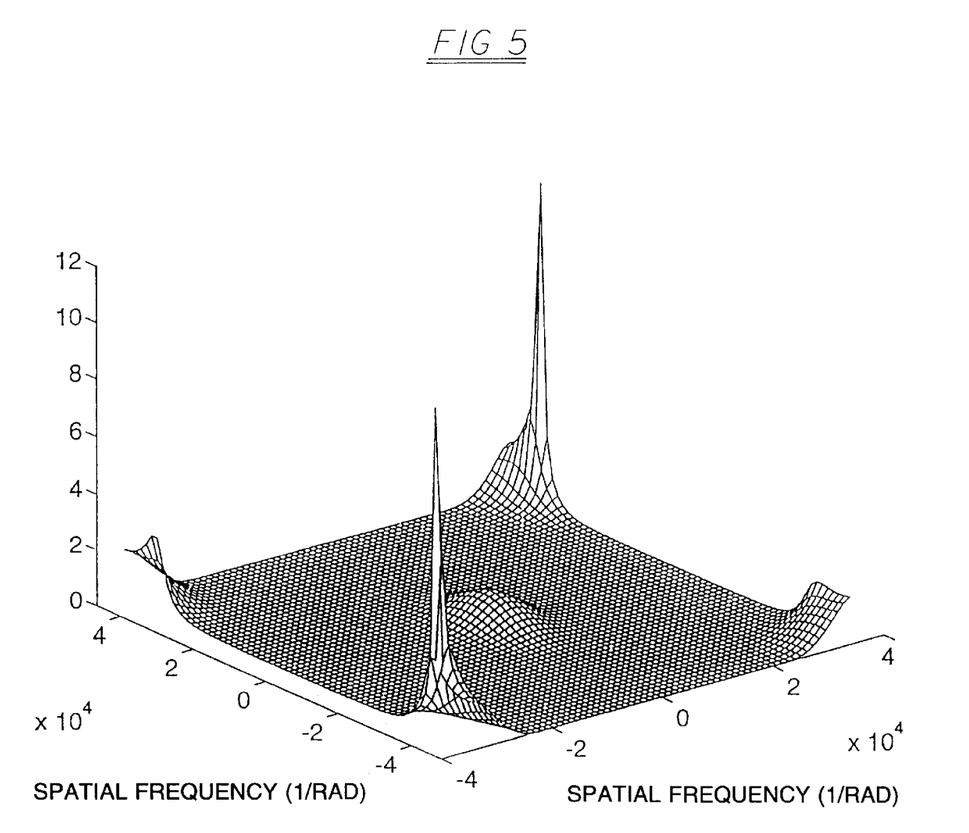
FIG. 5 shows a ratio between measured atmospheric PSF's power spectral density and calculated atmospheric PSF's power spectral density.

Typical measured average and standard deviation atmospheric MTF for a set of 100 images of the laser aperture are presented in FIG. 2. FIG. 3 presents the average squared measured atmospheric MTF for this set. In FIG. 4, the calculated average squared atmospheric MTF is presented, using equation (19). The ratio between the measured and calculated squared atmospheric MTF is presented in FIG. 5. It can be recognized that excellent agreement is achieved between theory and measurement, except at very high spatial frequencies. This can be explained by small inaccuracies in the measurement of atmospheric MTF at the very high frequencies, where the system's MTF is very poor and the MTF measurement is more likely to be affected by noise. Division by such low MTF values implies large imaging errors in atmospheric MTF even for small errors in imaging system MTF.

Figure 6:
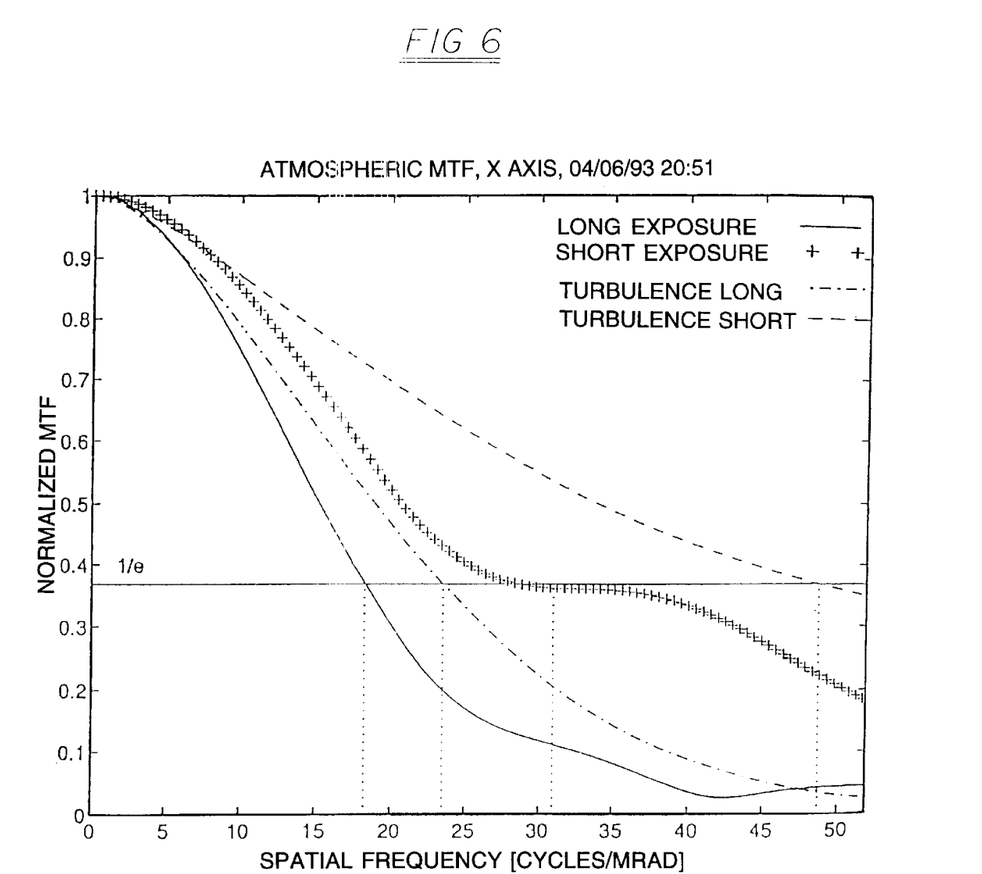
FIG. 6 shows a graphical comparison between measured overall atmospheric and turbulence MTF for both long and short exposure conditions.

A typical example of measured atmospheric and turbulence MTF for both long and short exposure cases is presented in FIG. 6. For each curve, its 1/e value is designated and related to a corresponding spatial frequency. Measured overall atmospheric MTF (continuous line for long exposure and pluses for short exposure in FIG. 6) results from a multiplication of turbulence MTF by aerosol MTF (assuming statistical independence). The difference between the long and short exposure results is due only to turbulence MTF variation, while practically aerosol MTF contributes similarly to overall MTF in both cases (short and long exposures). Therefore the improvement in overall atmospheric MTF from long to short exposure is much less than improvement in turbulence MTFs.

Figure 7:
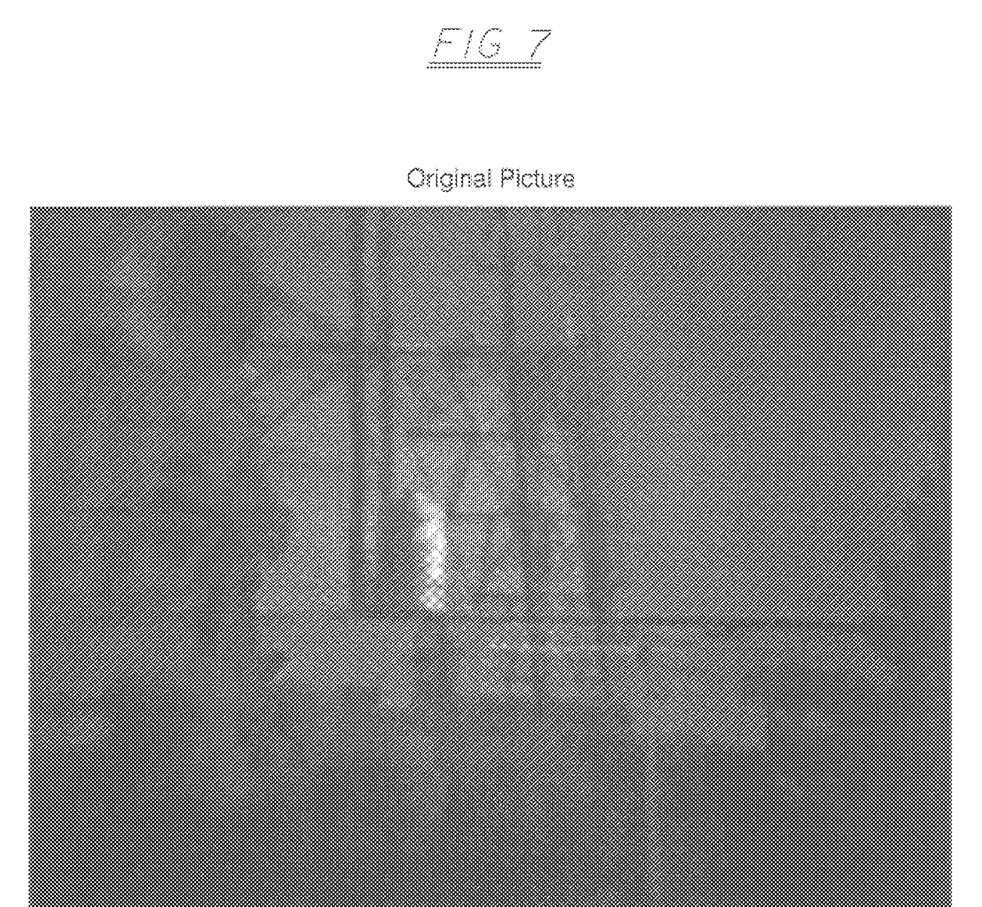
FIG. 7 shows an original atmospherically distorted image for 6.5 km horizontal distance and an elevation of 25 m for the Atmospheric MTF of FIG. 6.
Figure 8:
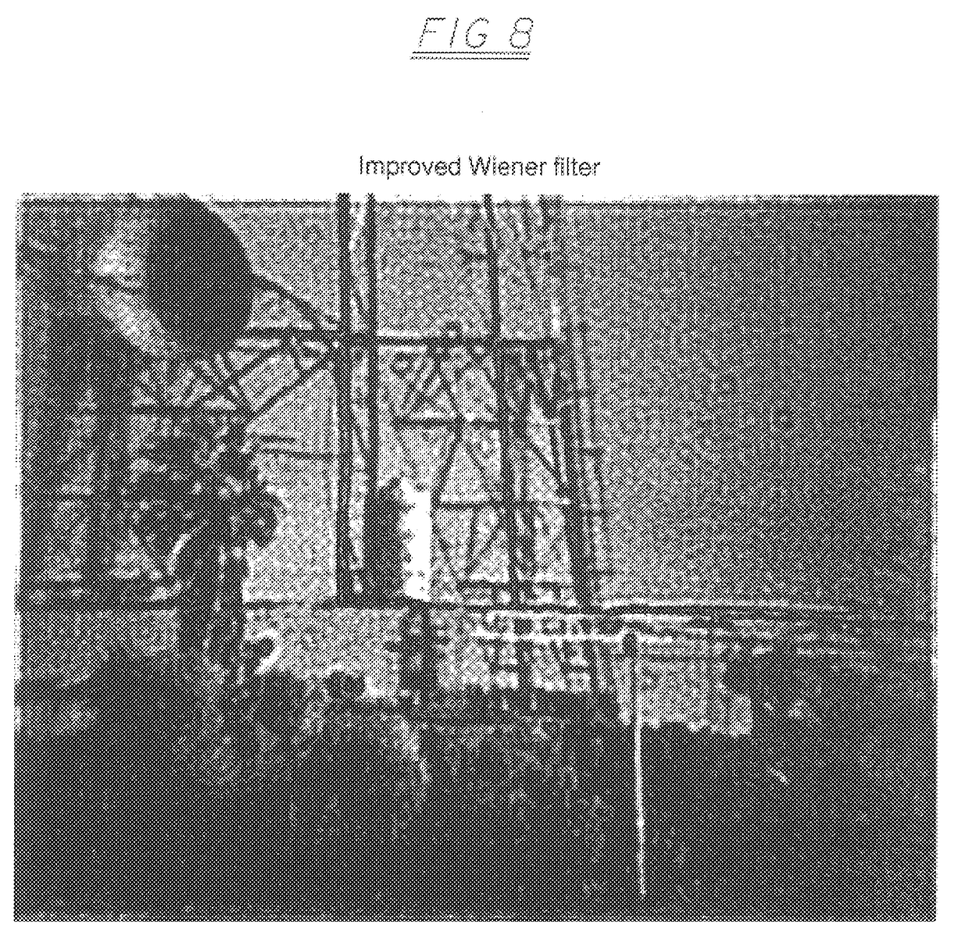
FIG. 8 shows a restoration of the image in FIG. 7, using the Improved Wiener Filter method of the invention.

Examples of image restoration using this new technique are presented in FIGS. 7 and 8. FIG. 7 represents the original image (6.5 Km horizontal distance) and FIG. 8 represents the restored image. The restoration was carried out by using equation (7). The term H(u,v) used was the measured atmospheric MTF. The term $S_{ff}(u,v)$ was estimated by best fit to a fractal model described in "Clutter Matrices For Target Detection Systems" by G. Tidhar et al., IEEE, *Transactions on Aerospace and Electrical Systems,* 30 Jan. 1994). The term $S_{n_2n_2}(u,v)$ was assumed to be white noise and the term $S_{n_1n_1}(u,v)$ was evaluated by equation (19). Restoration time was only about 2 seconds per frame. This can be shortened to a fraction of a second, using parallel processing techniques already available. Therefore, restoration via this method can be in real time. There is a distinct improvement in fine details of the images, even though the image's Signal to Noise Ratio (SNR) is not degraded significantly. This is so in spite of the severe imaging conditions (long horizontal distance), where turbulence isoplanatic patch was much less than image size.

Figure 9:
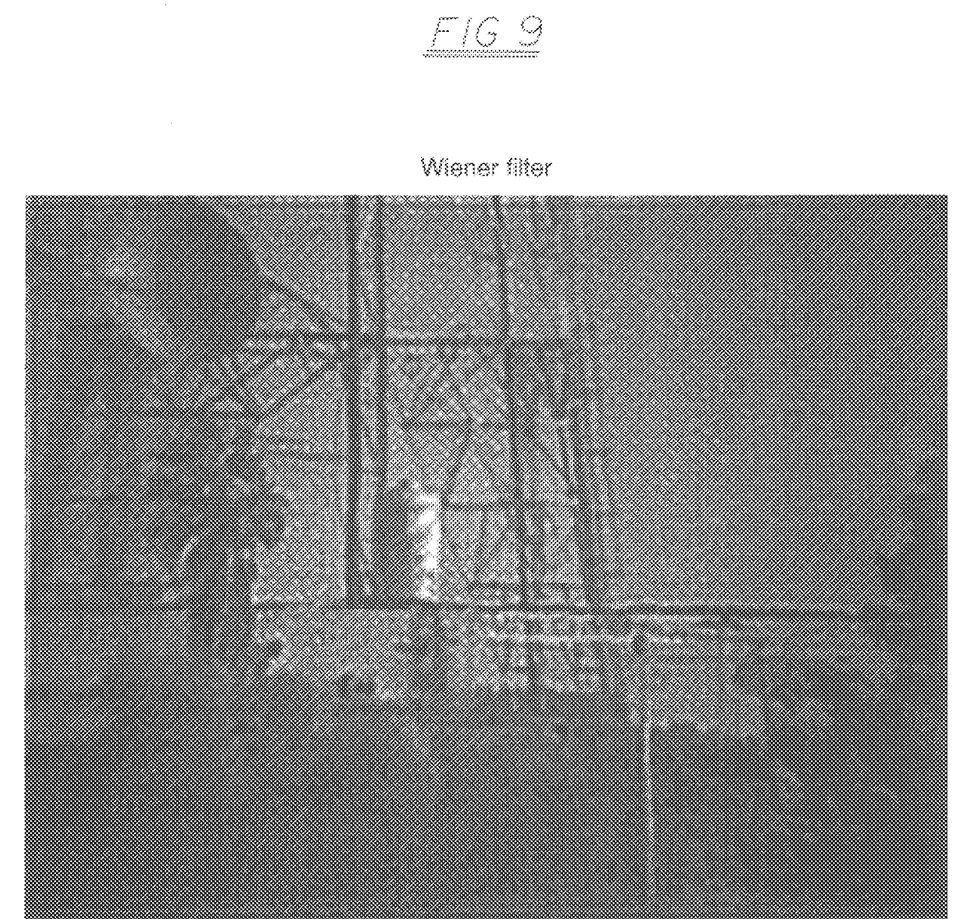
FIG. 9 shows an image restoration using a Wiener Filter for the image of FIG. 7.

Restoration was carried out also by using the standard Wiener filter. This was achieved by using the same atmospheric average turbulence and aerosol MTFs as in the improved methodology but, without considering any information about the multiplicative noise component n, which was imposed by turbulence jitter. An example of this restoration is presented in FIG. 9, for the same imaging of FIG. 7, where a Wiener filter characterized by equation (5) has been used. In this case, $S_{nn}(u,v)$ refers to instrumentation noise only.

The additional information about the atmospheric-induced noise imposed on the image contributes significantly to restoration performance improvement. In general, if the noise was negligible, the Wiener filter would have reduced to an inverse filter. However, for any practical system, including imaging systems and the atmosphere, its transfer function goes to zero at high spatial frequencies, so the inverse filter will approach infinity at high spatial frequencies. Since any practical image contains noise, the Wiener filter limits image enhancement at high spatial frequencies so as to prevent infinite noise enhancement in the restored image. This is demonstrated in FIG. 10, which represents a family of standard Wiener filters for different SNR conditions. For the correction in FIG. 9, the standard Wiener filter represented by the dash-dotted curve of FIG. 10 was used.

Figure 10:
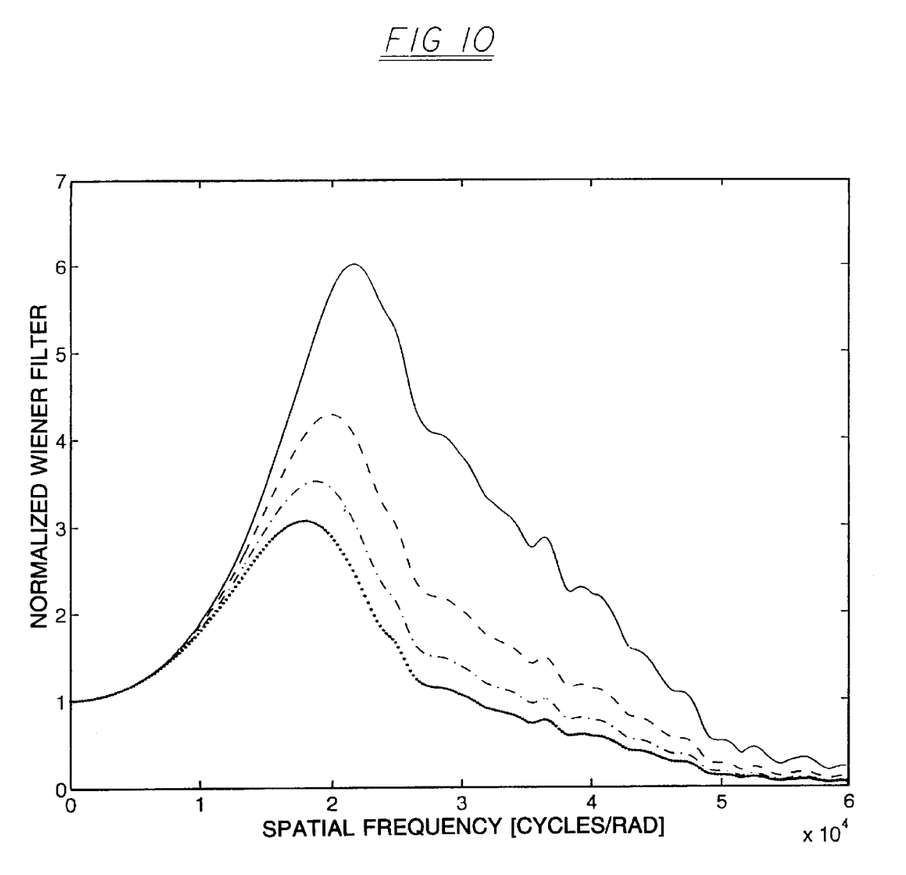
FIG. 10 shows a graph of the standard Wiener Filter as used in FIG. 9.
Figure 11:
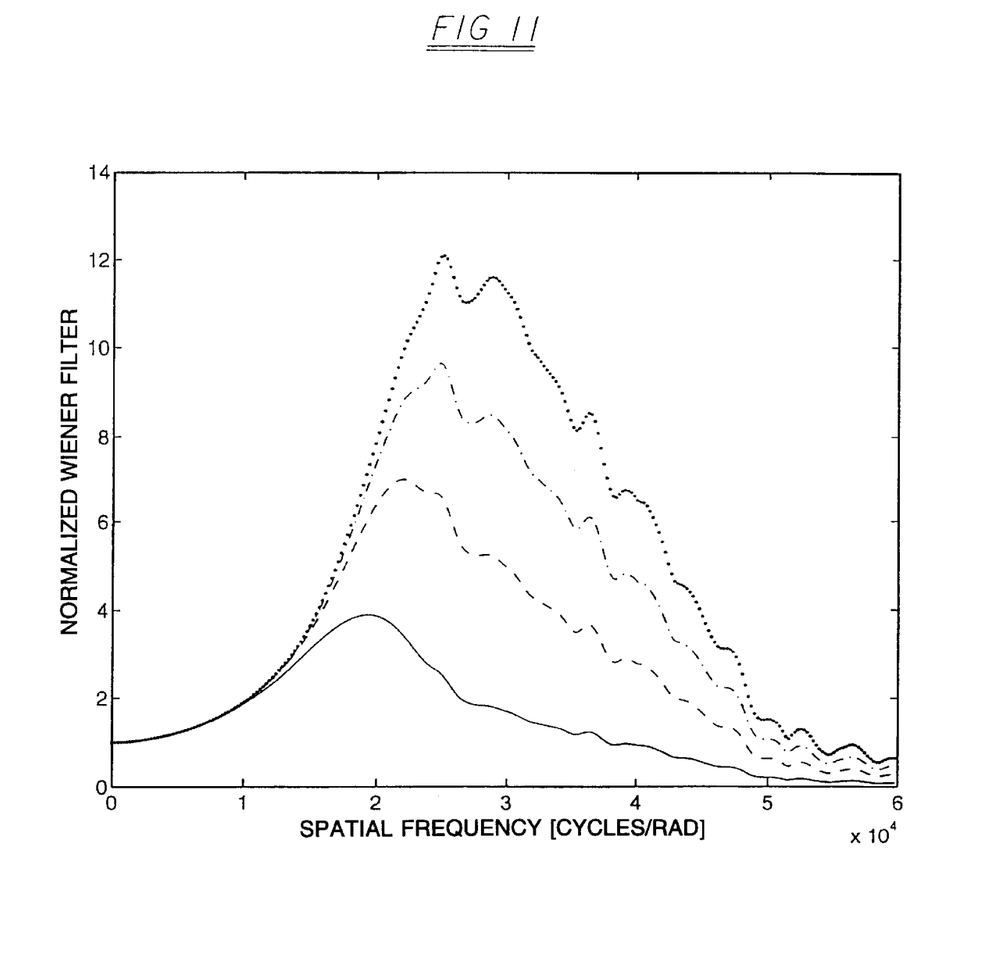
FIG. 11 shows a graph of the Improved Wiener Filter as used in FIG. 8.
Figure 12:
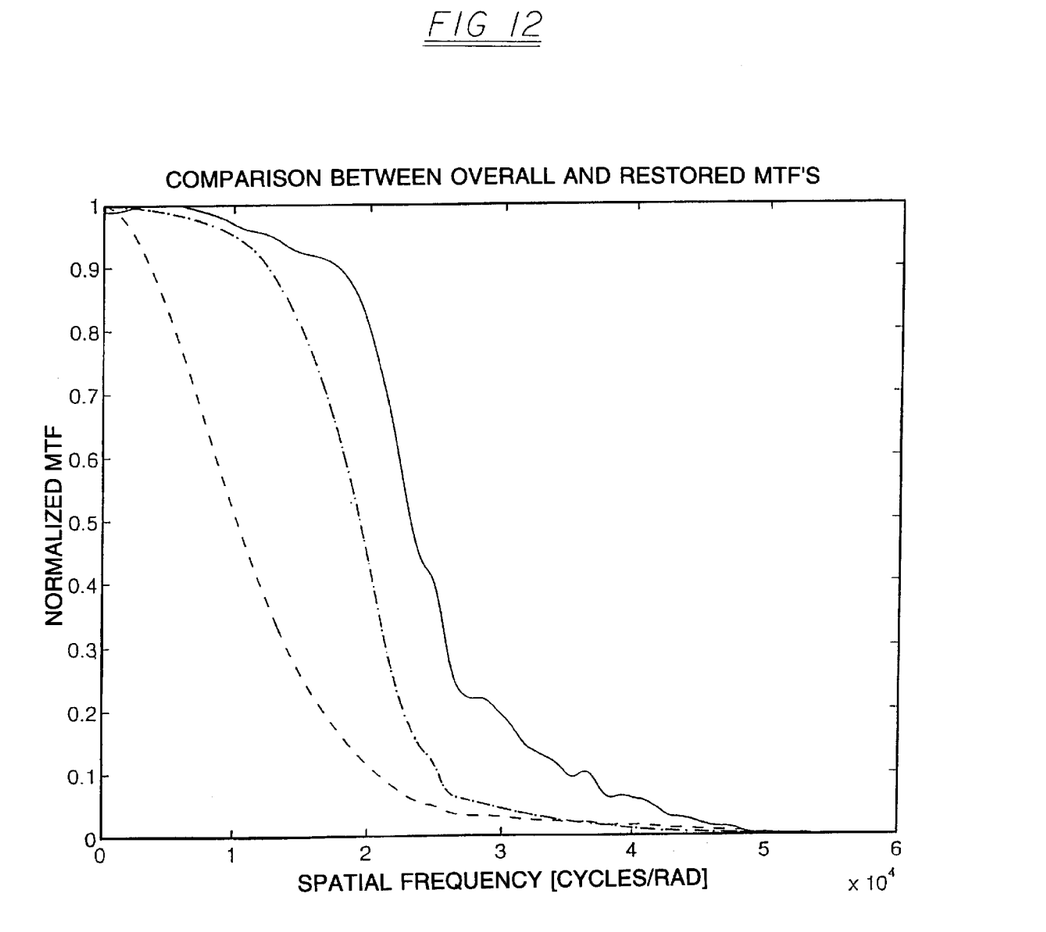
FIG. 12 shows a comparison between the original overall MTF (dashed), restored MTF using the standard Wiener Filter (dash-dotted), and restored MTF using the Improved Wiener Filter.
Figure 13A:
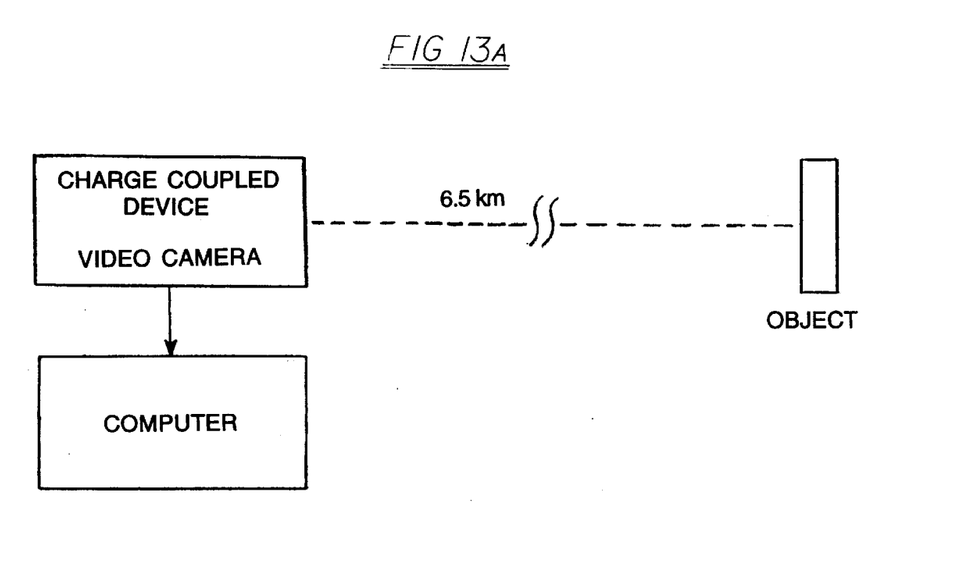
FIG. 13A depicts a video camera, a computer and object imaged.
Figure 13B:
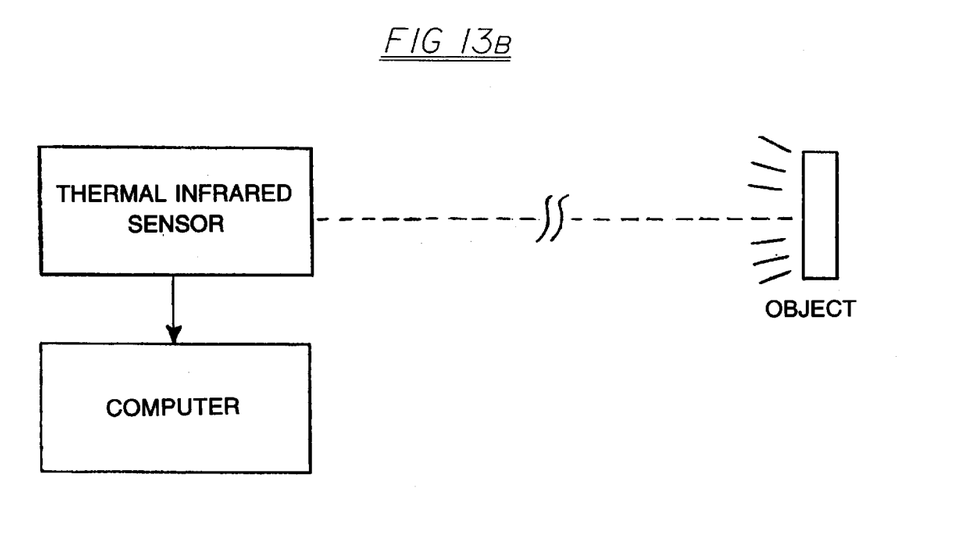
FIG. 13B depicts a thermal infrared sensor, a computer and object sensed.

However, in the case of atmospheric-induced noise caused by turbulence jitter, there is information about that noise that can be used in order to permit image enhancement by a filter at spatial frequencies higher than those included in the filters of FIG. 10. This atmospheric noise component is much larger at low spatial frequencies (where the turbulence has high values) and relatively small at high spatial frequencies. Therefore, it is possible to increase image enhancement at high spatial frequencies more than may be expected with a standard Wiener filter. This is demonstrated in FIG. 11, which represents Improved Wiener Filters based on the improved methodology above for different scaling factors of the multiplicative noise $N_2$. Weighting factor zero means N is zero, and the improved Wiener filter reduces to the standard Wiener filter. If the jitter is twice than in FIG. 7, then weighting factor 2 should be used. If the jitter is four times that in FIG. 7 (very heavy turbulence), then weighting factor 4 is used. For the correction in FIG. 8, a weighting factor of unity was used. FIG. 12 should be compared to FIG. 10, which represents the standard Wiener filters.

A quantitive comparison of restoration performance between the standard and Improved Atmospheric Wiener Filter is demonstrated in FIG. 12 in which the original overall MTF (dashed curve) including atmospheric and imaging system MTFs, the restored overall MTF (dash-dot curve) after the image was enhanced by the standard Wiener filter, and the restored overall MTF (continuous curve) after the image was enhanced by means of the Improved Atmospheric Wiener Filter are illustrated. It is clear that the improvement in image quality is greater while using the Improved Atmospheric Wiener Filter. MTF broadening to higher spatial frequencies implies resolution of smaller details. MTF increase in the vertical direction implies improved contrast. The advantage of the Improved Atmospheric Wiener Filter is attributable to its ability to characterize more correctly the noise limitations imposed by the atmospheric turbulence jitter. The fact that the noise spectrum is relatively weak at high spatial frequencies permits more enhancement at those spatial frequencies. This does not occur if additive noise only is assumed, as done with the standard Wiener filter.

An advantage of the Improved Atmospheric Wiener Filter developed here is that the correction is simultaneous for both aerosol and turbulence derived blur. Other advantages are simplicity and speed of implementation with a personal computer. All these advantages are significant when compared to adaptive optics techniques. The Improved Atmospheric Wiener Filter developed here in comparison to other filters shows clearly the improved image quality obtained with the former. The restoration is so effective that quantitative target acquisition modeling indicates that within experimental error all atmospheric blur is removed, even at visible wavelengths where turbulence effects are more severe.

The distribution size of particles in the atmosphere can also be evaluated to determine the aerosol MTF by using meteorological parameters as discussed in S. Shamriz, I. Sasson, D. Sadot, I. Dror and N. S. Kopeika, "Prediction of Overall Atmospheric MTF With Standard Weather Parameters: Comparison With Measurements With Two Imaging Systems," *Atmospheric Propagation and Remote Sensing IV*, J. C. Dainty, ed., *Proc. SPIE*, Vol. 2421, 1995 in addition to the use of a model as noted above.

We claim:

1. A method for restoring an image distorted by the atmosphere comprising the steps of:

imaging a distant object with means to convert electromagnetic radiation to electrical signals of the image g.

calculating the Fourier Transform G(u,v) of the image g where u and v are the spatial frequency coordinates;

determining the atmospheric Modulation Transfer Function (MTF) H(u,v);

calculating an Average Squared Atmospheric Function $E\{H^2(u,v)\}$ according to:

$$E\{H'^2(u,v)\} \propto H^2(u,v) \iint H^2(u',v') H(u'+u,v'+v) H(u'-u,v'-v) du' dv'$$

where E denotes the statistical expected value function; calculating a turbulence term $S_{n1n1}$ by the formula $$S_{n1n1} = E\{H'^2\} - H^2; \text{ and}$$

applying a restoration filter to the transformed image G wherein said filter is calculated by $$F(u,v) = \frac{G(u,v)}{H(u,v)} \cdot \frac{|H(u,v)^2|}{|H(u,v)^2| + [S_{n1n1} + S_{n2n2}(u,v)/S_{\hat{f}}(u,v)]};$$

where $S_{n2n2}$ is the power spectral density of the additive noise of the imaging device, $S_{\hat{f}}$ is the power spectral density of the image and $\hat{F}$ is the Fourier Transform of the restored image, and restoring the image transformed.

2. The method of claim 1 including the step of obtaining the image with a video camera.

3. The method of claim 1 including the step of obtaining the image with a thermal infrared sensor.

4. The method of claim 1 including the step of calculating the atmospheric MTF by multiplication of turbulence MTF and aerosol MTF.

5. The method of claim 4 wherein the turbulence MTF is evaluated using meteorological parameters.

6. The method of claim 4 wherein the aerosol MTF is evaluated according to the distribution of the size of particles in the atmosphere.

7. The method of claim 4 wherein the turbulence MTF is evaluated using meteorological parameters and the aerosol MTF is evaluated according to the distribution of the size of particles in the atmosphere.

8. The method of claim 1 wherein the atmospheric MTF is calculated by calculating the Fourier Transform of the atmospheric Point Spread Function (PSF) and dividing by the imaging system MTF.

9. The method of claim 1 including the step of obtaining the image with a charge coupled device video camera.

* * * * *